F. W. PETERS.
UNIVERSAL JOINT.
APPLICATION FILED MAY 11, 1917.

1,261,161.   Patented Apr. 2, 1918.

Inventor,
Fredrich W. Peters.
By Hull, Smith, Brock & West
Attys.

UNITED STATES PATENT OFFICE.

FREDRICH W. PETERS, OF WEST PARK, OHIO, ASSIGNOR TO THE PETERS MACHINE AND MANUFACTURING COMPANY, OF CLEVELAND, OHIO, A CORPORATION OF OHIO.

UNIVERSAL JOINT.

1,261,161. Specification of Letters Patent. Patented Apr. 2, 1918.

Application filed May 11, 1917. Serial No. 167,861.

*To all whom it may concern:*

Be it known that I, FREDRICH W. PETERS, a citizen of the United States, residing at West Park, in the county of Cuyahoga and State of Ohio, have invented a certain new and useful Improvement in Universal Joints, of which the following is a full, clear, and exact description, reference being had to the accompanying drawings.

This invention relates to improvements in universal joints, and it has for its general objects the attainment of strength, durability, ease of operation, simplicity of construction and convenience of assembly, in joints of the aforesaid character.

More limitedly stated, the invention purposes to improve the construction of universal joints of the class shown in Letters Patent of the United States Nos. 956,191 and 994,278, granted, respectively, April 26, 1910, and June 6, 1911, to Louis Schwitzer.

Figure 1:
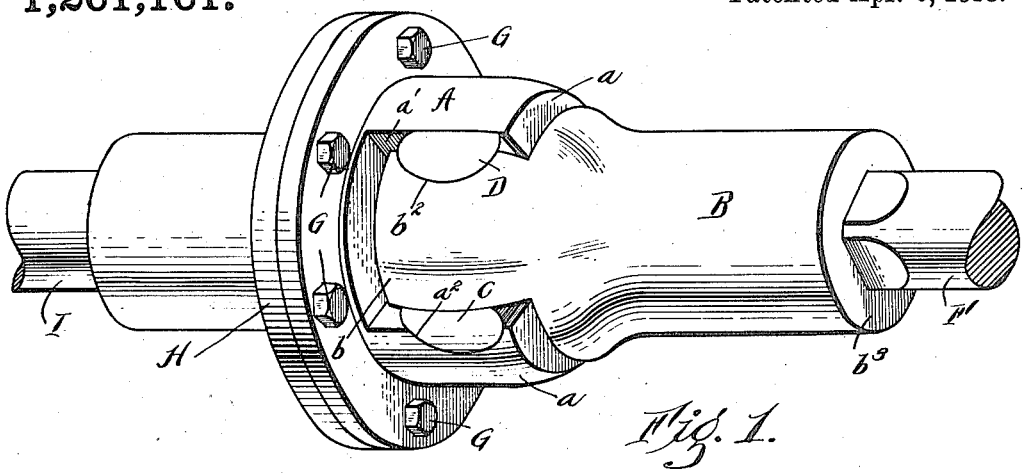
Figure 2:
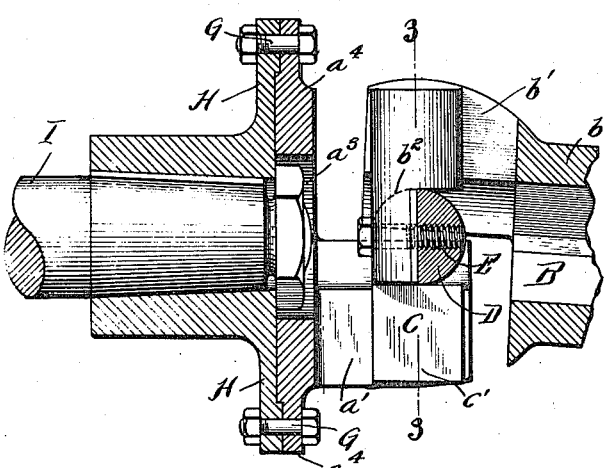
Figure 3:
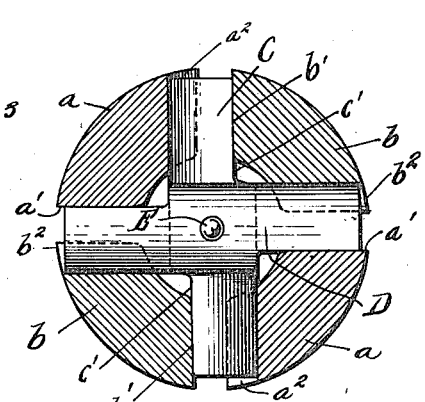
Figure 4:
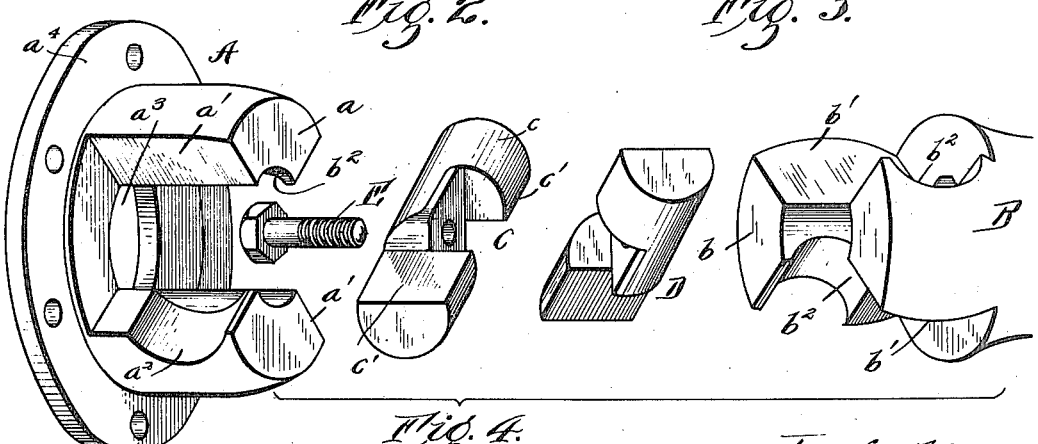

An embodiment of my invention is illustrated in the accompanying drawing wherein Figure 1 is a perspective view of my improved joint; Fig. 2 is a central longitudinal section through the same; Fig. 3, a transverse section on the line 3—3 of Fig. 2, and Fig. 4 is a perspective view of the several elements of the joint in separated condition.

The joint comprises two members A and B which are provided, respectively, with diametrically opposed projections $a$ and $b$, the projections of one member being arranged to interfit with those of the other when the joint is assembled.

The projections $a$ and $b$ are shown as segmental, and one of the substantially radial faces of each is flat, as shown respectively at $a'$ and $b'$, such face being in a plane parallel with the longitudinal axis of the joint. The other substantially radial faces of the respective projections $a$ and $b$ are provided with recesses $a^2$ and $b^2$ that are practically semi-cylindrical, the recesses of the two projections of each member having a common axis so that, if a cylindrical element of the same radius as the recesses were inserted transversely through the member, a side portion of each of its ends would fit accurately within one of the recesses, with the axis of such element intersecting the longitudinal axis of the joint.

Pursuing this suggestion as a means of convenient description, an element C has the curved faces $c$ of its opposite ends fitted within the recesses $a^2$ of the member A. The side of the element opposite each of its curved faces is cut away to produce a flat face $c'$ for engagement with the adjacent flat face $b'$ of the member B. A second element D, substantially identical with the element C, is associated in like manner with the member B, and the elements C and D are cut half away at their longitudinal centers so as to interfit where they cross each other and possess, at this point, an aggregate thickness no greater than their individual diameters. The central cut away portion of the element C has a smooth transverse bore through which a screw E passes and is threaded into an aperture of the element D, the member A having an opening $a^3$ through which access of the screw may be had. From the foregoing construction it will be evident that the members A and B are capable of free angular movement with respect to each other, the flat faces of the elements C and D sliding freely over the corresponding faces of the adjacent projections, while the curved faces of said elements rock within the recesses of the projections.

The essential advantages of my invention over the constructions shown in the previously named patents are the ability of the joint to withstand greater longitudinal thrusts and pulls—the sturdy, comparatively heavy crossed portions of the elements C and D resisting the thrusts, while the screw E capably takes any tensional strains between the members; the ease of assembling the joint—it being evident that after each of the elements C and D are placed within the recesses of their respective members, the members may be simply placed together endwise and the screw E inserted; together with the very obvious advantages of simplicity of construction and cheapness of manufacture.

In its present embodiment, the invention is designed for use in automobile or like constructions, the elements B being provided with an integral, socketed sleeve $b^3$ for the reception of the end of a shaft section F, the interfitting portions of the sleeve and shaft being shaped to allow longitudinal movement only between the parts. The member A, as shown, is provided with a flange $a^4$ for connection, by means of the bolts G, with the flanged fitting H that may be secured in any well known manner to the end of a shaft section I.

Having thus described my invention, what I claim is:—

1. A universal joint comprising two members each having diametrically opposed lugs interfitting between the lugs of the other, a pair of crossed elements the ends whereof extend between opposed faces of adjoining lugs, one of said opposed faces being recessed for interlocking and rocking engagement with said end of the elements while the opposite face has sliding contact therewith, and means connecting the crossed portions of the elements.

2. A universal joint comprising two members, each having diametrically opposed lugs interfitting between the lugs of the other, a pair of crossed elements the ends whereof extend between opposed faces of adjoining lugs, one of said opposed faces having a substantially semi-cylindrical recess for the reception of a correspondingly shaped portion of said end of the element while the opposite face is flat for engagement with a flat face of said end, and means for connecting the crossed portions of the elements.

3. A universal joint comprising two members, each having diametrically opposed lugs interfitting between the lugs of the other, a pair of crossed elements the ends whereof extend between opposed faces of adjoining lugs, one of said opposed faces having a substantially semi-cylindrical recess for the reception of a correspondingly shaped portion of said end of the element while the opposite face is flat for engagement with a flat face of said end, the crossed portions of the elements being cut away so as to interfit within the scope of the diameter of one of said elements, and means connecting the crossed portions of the elements.

4. A universal joint comprising two members, each having diametrically opposed lugs interfitting between the lugs of the other, a pair of crossed elements the ends whereof extend between opposed faces of adjoining lugs, one of said opposed faces having a substantially semi-cylindrical recess for the reception of a correspondingly shaped portion of said end of the element while the opposite face is flat for engagement with a flat face of said end, the crossed portions of the elements being cut away so as to interfit within the scope of the diameter of one of said elements, such crossed portions having alining bores substantially coincident with the longitudinal axis of the joint, and means occupying said bores for connecting the elements, one of said members having a central aperture through which access to said means may be had.

In testimony whereof, I hereunto affix my signature.

FREDRICH W. PETERS.